Aug. 1, 1939.　　　W. F. KIESEL, JR　　　2,168,294
RAILWAY CAR BRAKE MECHANISM
Filed June 18, 1936　　　4 Sheets-Sheet 2
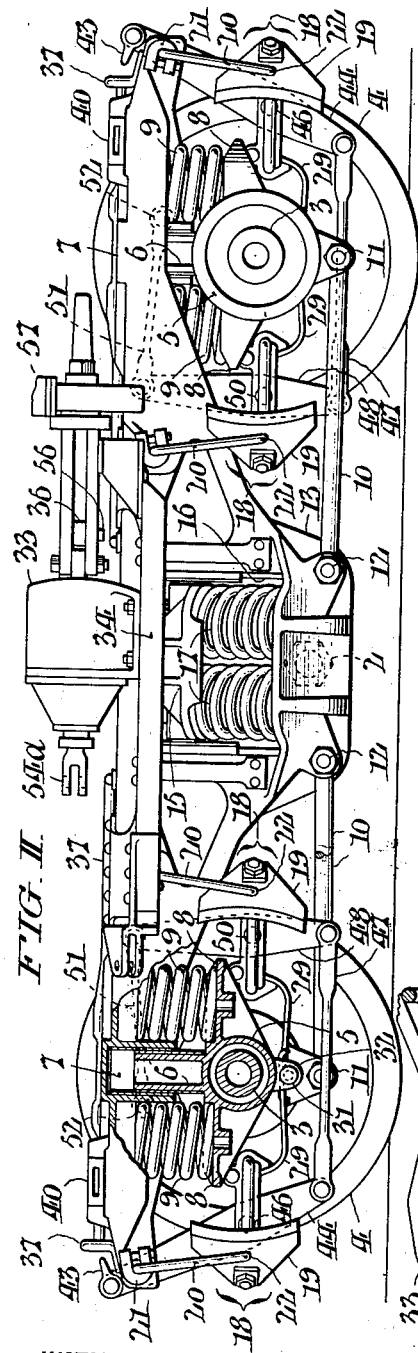
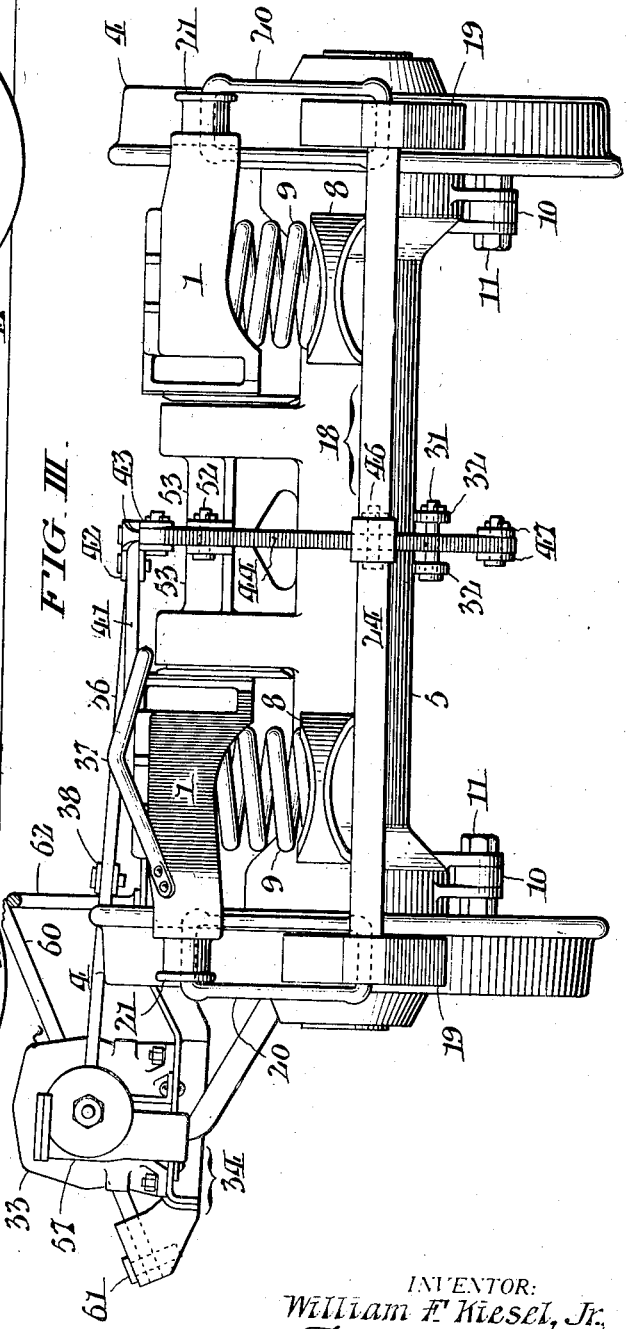
WITNESSES:
John C. Bergner
John A. Weidler
INVENTOR:
William F. Kiesel, Jr.
BY
ATTORNEYS.

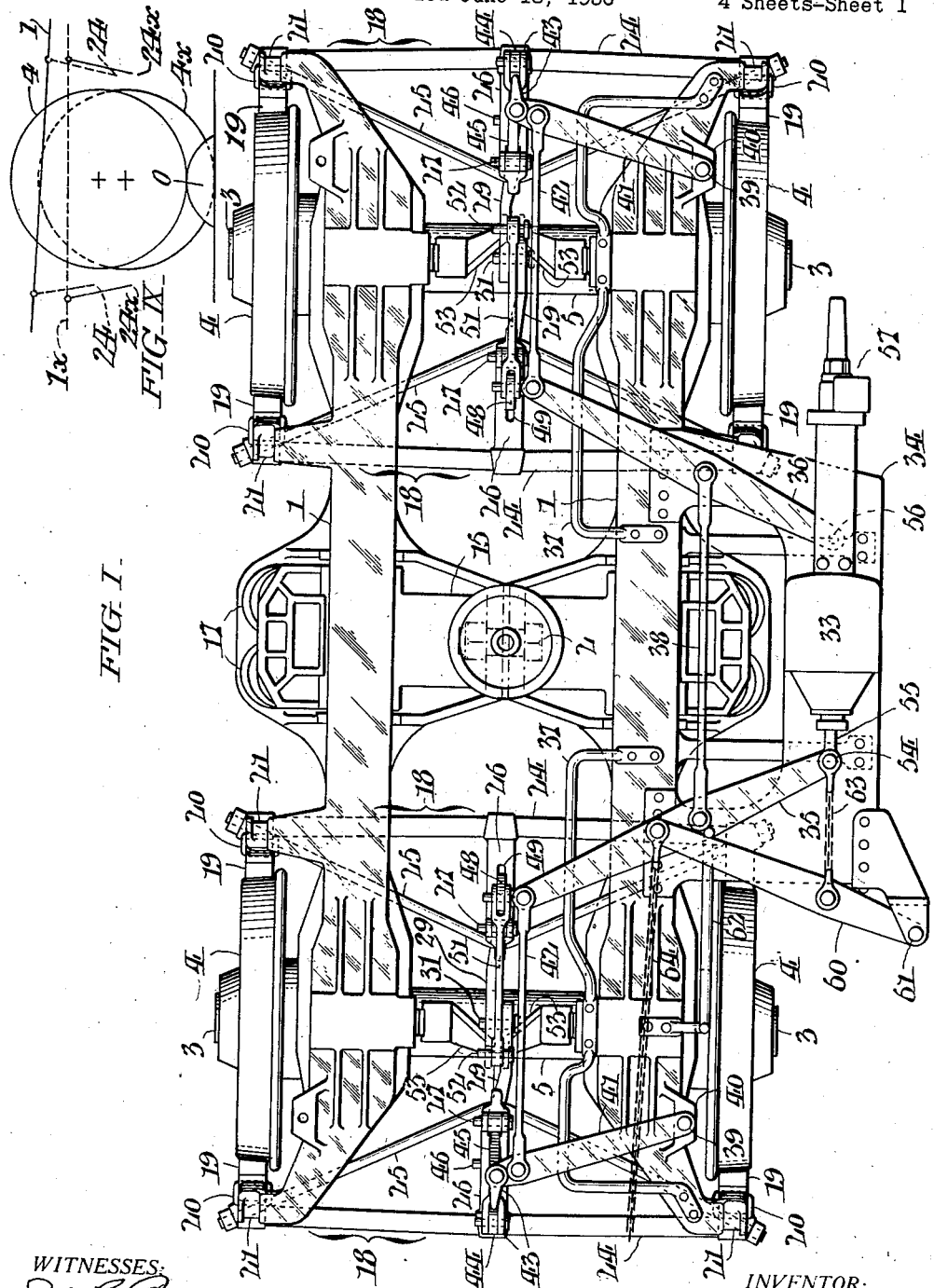

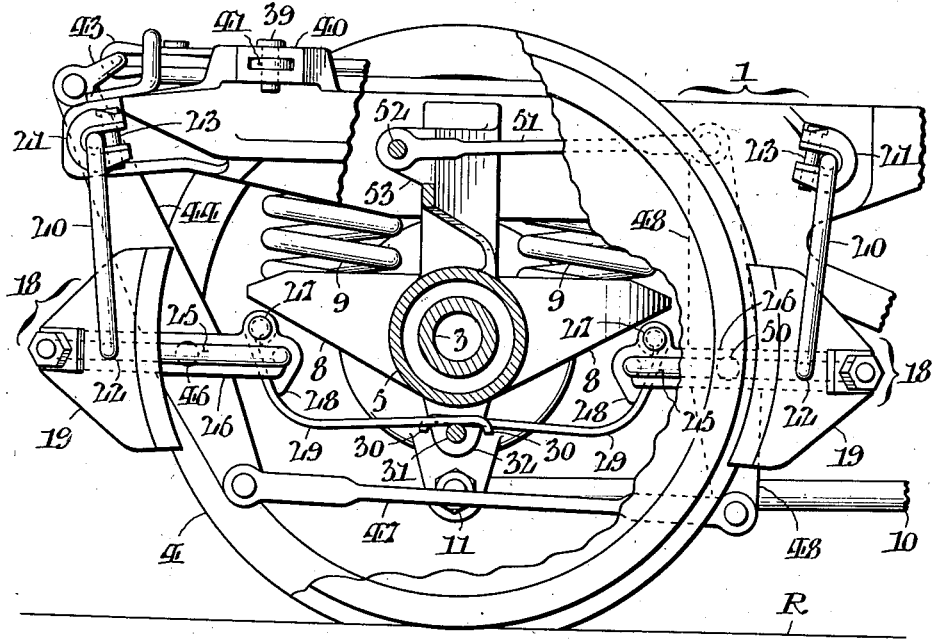
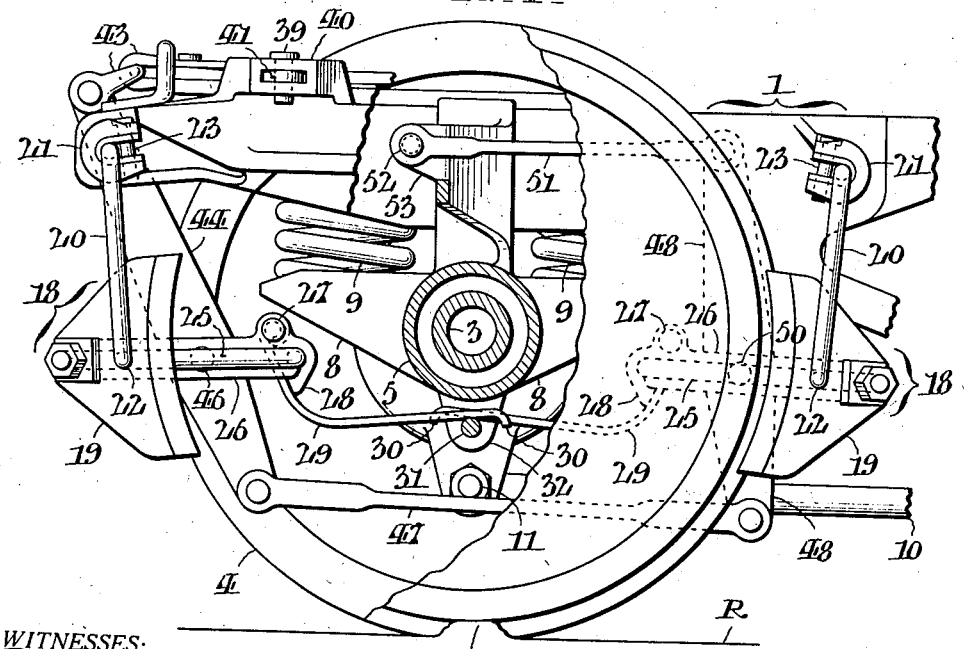

Aug. 1, 1939.    W. F. KIESEL, JR    2,168,294
RAILWAY CAR BRAKE MECHANISM
Filed June 18, 1936    4 Sheets-Sheet 4
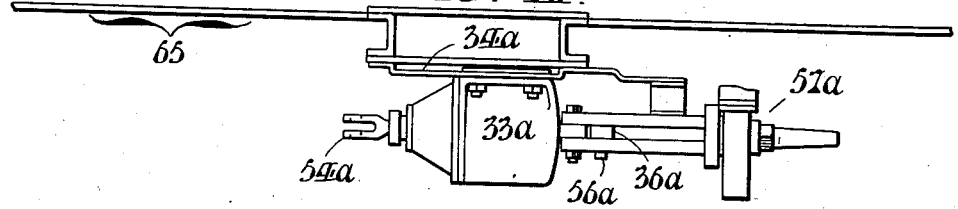
FIG. VII.
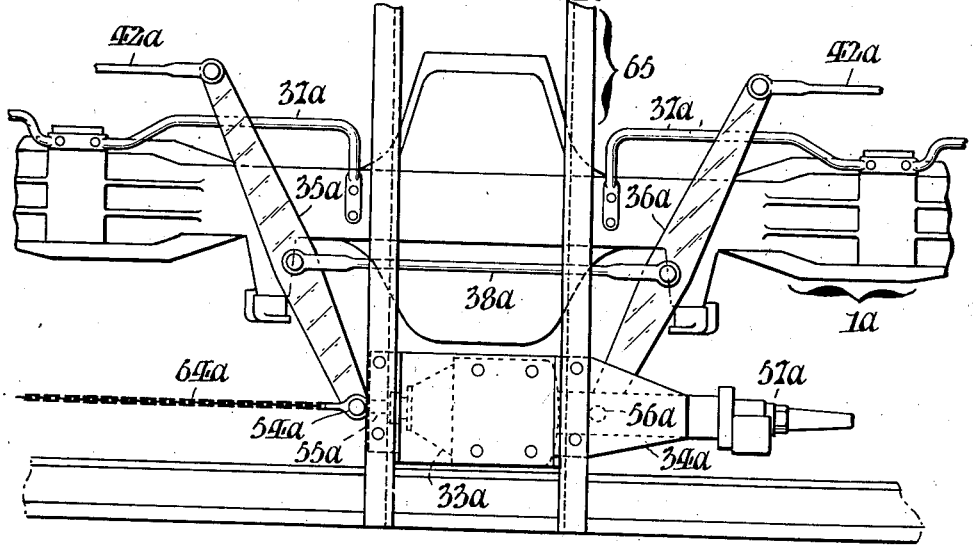
FIG. VI.
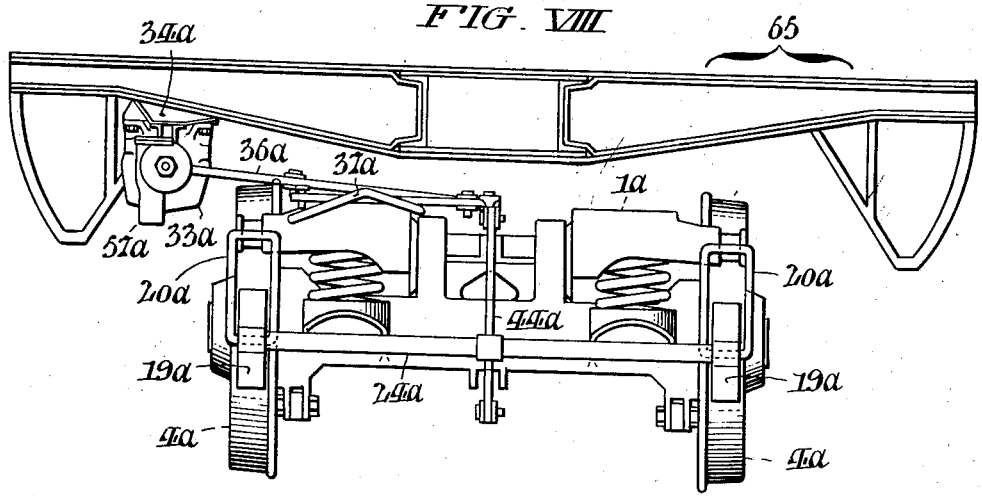
FIG. VIII.
WITNESSES:
John C. Bergner
John A. Weidler
INVENTOR:
William F. Kiesel, Jr.,
BY Fraley Paul
ATTORNEYS.

Patented Aug. 1, 1939

2,168,294

UNITED STATES PATENT OFFICE 2,168,294

RAILWAY CAR BRAKE MECHANISM

William F. Kiesel, Jr., Hollidaysburg, Pa., assignor to The Pennsylvania Railroad Company, Philadelphia, Pa., a corporation of Pennsylvania Application June 18, 1936, Serial No. 85,831

7 Claims. (Cl. 188—56)

This invention relates to brake mechanism for railway cars; and it has reference more particularly to clasp brake mechanism useful in connection with car trucks such as featured in my copending application, Serial No. 81,658, filed on May 25, 1936.

In the truck of the application referred to, the frame consists of two longitudinal side components which have capacity for independent up and down movement about a transverse connecting pivot, the wheel axles of the truck being journaled within axle housings with upstanding projections slidingly engaging guide boxes at opposite ends of the frame components, and the truck frame being supported by springs resting on the axle housings. Thus as the wheels of the truck pass over irregularities in the rails, pivotal action can take place between the frame components, which function as independent equalizers at opposite sides of the truck incident to the up and down movement of the journal housings.

In connection with brake mechanism suitable for trucks of the indicated character, I aim to compensate for the relative movement between the frame components and the axle housings in such a way that the faces of the brake shoes are at all times maintained in accurate circumferential alignment with the wheels.

Another object of my invention is to secure the above advantage in a brake mechanism having its actuating parts all supported on one of the interpivoted frame components and operable by a single cylinder.

Other objects and attendant advantages will appear in the following detailed description of the attached drawings, wherein Fig. I shows the plan view of the car truck of the pending application, supra, embodying my improved brake mechanism which is pictured in full lines, and wherein the brake cylinder is mounted on the truck.

Fig. II shows the organization in side elevation, with the wheels at the near side of the truck removed, and with a portion of the truck in longitudinal section.

Fig. III shows the elevation of one end of the truck and brake mechanism.

Fig. IV is a fragmentary detail view, partly in side elevation and partly in longitudinal section, drawn to a larger scale; and Fig. V is a view similar to Fig. IV, showing more or less exaggeratedly, the changed relation of the parts of the truck and the brake mechanism, when one of the truck wheels passes over an obstruction on the track rail.

Fig. VI is a fragmentary plan view corresponding to Fig. I showing an alternative form of my invention; wherein the brake cylinder is mounted on a bolster of the car body.

Fig. VII is a fragmentary view in side elevation showing how the brake cylinder is supported by the car body bolster.

Fig. VIII is an end elevation of the organization shown in Figs. VI and VII with the truck and the bolster of the car body in dot-and-dash lines, and the brake mechanism in full lines; and Fig. IX is a diagram showing the action of the brake mechanism.

With more detailed reference to these illustrations, the numeral 1 designates the two longitudinal side components of the truck frame which are capable of relative up and down movement about a transverse central connecting pivot bolt 2 centrally of said frame. The axles 3 for the wheels 4 are journaled in tubular housings or quills 5 with upstanding projections 6 slidingly engaging guide boxes 7 at opposite ends of the frame components, and with lateral seats 8 for upright helical springs 9 whereon the truck frame is supported. Horizontal tie rods 10 at opposite sides of the truck, each having a pivotal connection 11 at one end with one of the axle housings, and a pivotal connection 12 at the other end with the pendant central yoke portion 13 of one of the truck frame components 1, serve to maintain the wheel axles 3 parallel and prevent binding of the upstanding guide projections 6 on said axle housings in the guide boxes 7 of said frame components. The bolster 15 of the truck extends crosswise over the pivot axis 2 connecting the two frame components 1, with its ends engaging within the vertical yoke openings 16 of said components, and is borne by helical springs 17 resting on the bottoms of said yoke openings.

The brake mechanism with which the present invention is more especially concerned comprises transverse beams 18 of which there are two diametrically-opposing ones for each pair of the truck wheels 4, and to the ends of which are secured the individual brake shoes 19. As shown in Figs. II, IV and V, the brake beams are suspended from the side components 1 of the truck frame by hangers 20 which are fulcrumed in clevis bearings 21 integrally formed on the outer sides of the said frame components, and pivotally connected at their lower ends at 22 to the brake shoes, removable keeper pins 23 being relied upon to retain said hangers 20 in said bearings. The main bars 24 of the brake beams 18 are reinforced, after more or less common practice, by angularly bent or bowed tension members or brace rods 25, and by struts 26 which extend between the center points of said rods and bars. Povitally connected at 27 to the struts 26 at the "noses" of the beams 18 and buttressed by stop lugs 28 on said struts, are downwardly and inwardly-bent spring fingers 29 whereof the free ends 30 rest upon a cross pin 31 extending between spaced pendant ears 32 centrally of the axle housings, see Figs. III–V. Thus, upon relative motion between the side components 1 of the frame and axle housing 5, as one of the corresponding wheels passes over obstructions, such as at O in Fig. V, on the track rail R, the two brake beams 18 will be compensatively swung upward about their suspension pivots 22 through lifting of the spring fingers 29 by the pin 31, and the inner surfaces of the shoes substantially maintained circumferentially aligned or concentric with the treads of such wheel to prevent the tops of the shoes from "riding" the wheel when the brakes are released. This action will be better understood from Fig. IX of the drawings in which 4 designates one of the wheels at the near side of the truck, and 4x designates the corresponding wheel at the far side. The full line 1 represents the near side truck frame component which has swivelled about the pivot 2 in Fig. I relative to the far side truck component represented by the dash and dot line 1x, due to riding of the wheel 4 up the obstruction O on the rail. As a consequence of this swivelling, the end of the near side frame component 1 at the wheel 4 moves upward with said wheel by substantially the same amount. Now since the near ends of the brake beams represented by the points 24 are suspended directly from the frame component 1, they too will be lifted by a corresponding amount, while the distal ends 24x of said beams are left practically undisturbed. Moreover since, incidentally, the brake beams take an inclined position parallel with the wheel axle, and since the fingers 29 (Fig. II) rest on the centers of the axles, it will be seen that the parallelism of the brake shoes with relation to the treads of the wheels 4, 4a will be substantially maintained, when one of the wheels passes over an obstruction on the rail. Substantial circumferential alignment of the brake shoe surfaces will be similarly maintained as relative movement takes place between the interpivoted frame components 1 and an axle housing or quill 5 during passage of one of the wheels over a depression or joint gap in the rail R, when the dropping of the axle housing will be attended by downward movement of the spring fingers and compensative downward movement of the brake beams 18 about the suspension pivots 22.

The operating instrumentalities for the brakes include an air cylinder 33 which, in this instance, is supported by a lateral bracket 34 on one of the frame components 1 of the truck and serves to actuate a pair of transversely-arranged horizontal levers 35 and 36. As shown in Figs. I and II, the levers 35, 36 are floatingly supported on bar brackets 37 secured to the top of the frame component 1 at that side of the truck occupied by the cylinder 33, said levers being connected intermediate their ends by a longitudinally-extending link 38. Fulcrumed at 39 to lugs 40 at the top of the cylinder-supporting truck frame component 1 are supplemental levers 41 which extend substantially parallel to the levers 35 and 36 and which are coupled with the inner ends of the latter by supplemental longitudinal links 42, said levers 41 being also sustained by the bar brackets 37. The inner ends of the supplemental levers 41 are loosely connected by means of shackles 43 to the tops of vertical levers 44, which are located at the ends of the truck and which extend down through slots 45 in the struts 26 of the outer brake beams 18 for pivotal connection at intermediate points 46 to said spacers. The lower ends of the levers 44 are in turn coupled, by means of horizontal links 47 underreaching the axle housings or quills 5, to the bottom ends of vertical levers 48 at the inner sides of the wheel axles 3. The vertical levers 48 just referred to extend upward through slots 49 in the struts 26 of the inner pair of brake beams whereto they are medially fulcrumed at 50, and the top ends of said levers 48 are pivotally connected to horizontal links 51 fulcrumed at 52 to clevised bracket arms 53 centrally of the axle housings or quills 5. As shown, the lever 35 is pivotally connected at 54 to the piston rod 55 of the cylinder 33, and the lever 36 pivotally connected at 56 to a slack-adjusting means 57 which may be of any approved standard type.

For the purposes of manual operation of the brakes, there is provided a lever 60 which is fulcrumed at 61 to the motor bracket 34, and which is sustained by another bar support 62 on the motor carrying-component 1 of the track. At an intermediate point, the lever 60 is coupled, by a chain 63, with the pivot connection 54 of the lever 35 and the piston rod 55 of the cylinder 33. By means of another chain 64, the lever 60 is coordinated with the shaft of the usual brake hand wheel or lever (not shown) on the car body.

The floating linkage arrangement just described will obviously permit self-adjustment of the brake beams 18 during simultaneous application and release of the brakes, and thus accomodate the relative movement between the two frame components 1, and between said frame components and the axle housings 3 after the manner hereinbefore explained.

In the alternative embodiment of my invention shown in Figs. VI–VIII, the brake cylinder 33a is suspended from a bracket 34a on a transverse beam or bolster 65 of the car body; while the chain 64a for the manual operation of the brakes is directly connected to the pivot pin 54a at the juncture of the lever 35a and the piston rod 55a of said cylinder. In all respects, the brake mechanism of Figs. VI–VIII is exactly like that of Figs. I–V, and, accordingly, in order to preclude the necessity for repetitive description, all corresponding parts in the modification have been identified by the same reference numbers previously employed with the addition, however, of the letter "a" in each instance as a distinguishing character.

From the foregoing it will be apparent that I have provided a brake system for the specific type of truck illustrated, which adapts itself to the various requirements of train operation with assurance of efficient brake application and absence of brake shoe dragging when the brakes are released, and which is unique in that the brake operating means is wholly carried by one of the pivoted truck frame components.

Having thus described my invention, I claim:

1. In combination, a railway car truck having a frame with longitudinal side components connected centrally by a transverse pivot, and the wheel axle journals confined to up and down movement in guides at opposite ends of the frame components; and brake mechanism comprising brake shoes on the beams for the individual wheels, and means connecting the beams with the axle journals operative during relative pivotal movement between the side components of the frame and relative up and down movement between the axles and the frame to affect the brake beams for maintenance of the shoes substantially in circumferential alignment with the wheels.

2. The combination defined in claim 1, including equalizing linkage means floatingly supported by one of the frame components for actuating the brake beams.

3. The combination defined in claim 1, including brake actuating means comprising a fluid pressure cylinder mounted on one of the frame components, and equalizing linkage floatingly supported by the same frame component whereby the movements of the cylinder piston are communicated to the brake beams.

4. In combination, a railway car truck having a frame with longitudinal side components connected centrally by a transverse pivot, and wheel axle journals confined to up and down movement in guides at the opposite ends of the frame components; and brake mechanism comprising brake shoes for the individual wheels, transverse beams connecting corresponding pairs of the shoes; hangers whereby the beams are pivotally suspended at opposite ends from the respective side components of the frame, and means connecting the brake beams with the wheel axle journals, so that incident to relative pivotal movement between the frame components and relative to up and down movement between the wheel axle journals and the truck frame, the brake shoes are maintained substantially in circumferential alignment with the wheels.

5. In combination, a railway car truck having a frame with longitudinal side components connected centrally by a transverse pivot, and journal quills for the wheel axles confined to up and down movement in guides at opposite ends of the frame components; and brake mechanism comprising brake shoes for the individual wheels, transverse beams connecting corresponding pairs of the shoes, hangers whereby the beams are pivotally suspended at opposite ends from the respective side components of the frame, and means connecting the beams with the journal quills so that, incident to relative pivotal movement between the two frame components and relative to up and down movement between the quills and the truck frame, the brake shoes are maintained substantially in circumferential alignment with the wheels.

6. The combination defined in claim 4, including means for actuating the brakes comprising a fluid pressure cylinder mounted on one of the frame components, and equalizing linkage floatingly supported by the same frame component whereby the movements of the cylinder piston are communicated to the brake beams.

7. The combination defined in claim 5, including means for actuating the brakes comprising a fluid pressure cylinder mounted on one of the frame components, and equalizing linkage floatingly supported by the same frame component whereby the movements of the cylinder piston are communicated to the brake beams.

WILLIAM F. KIESEL, JR.